Sept. 26, 1967     L. ROMANI ETAL     3,343,403
APPARATUS FOR THE MEASUREMENT OF THE VELOCITY
OF SOUND IN A GAS
Filed Jan. 13, 1964
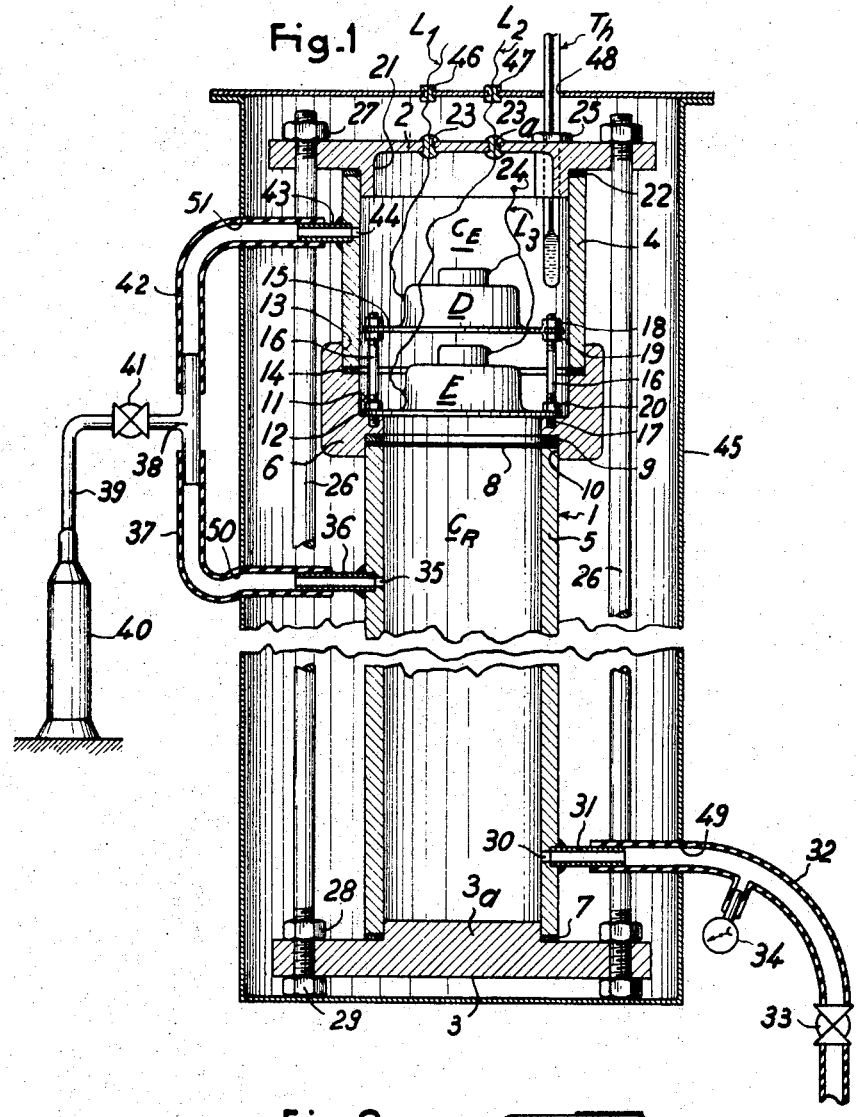
INVENTORS
CLAUDE FRIERESE
JEAN MEUWESE
LUCIEN ROMANI
Bacon & Thomas
ATTORNEYS

United States Patent Office

3,343,403
Patented Sept. 26, 1967

---

3,343,403
APPARATUS FOR THE MEASUREMENT OF THE VELOCITY OF SOUND IN A GAS
Lucien Romani, Le Plessis-Robinson, Jean Meuwese, Saint-Maur, and Claude Frierese, Clamart, France, assignors to Commissariat à l'Energie Atomique, Paris, France
Filed Jan. 13, 1964, Ser. No. 337,373
Claims priority, application France, Jan. 28, 1963, 922,831
7 Claims. (Cl. 73—24)

The present invention relates to an apparatus for the determination of the velocity of propagation of sound in any gas, particularly for the purpose of effecting measurements of pollution of such a gas by another gas.

The methods of measurement of the velocity of propagation of sound in any particular medium can generally speaking be classified in two main categories depending on whether they make use of travelling waves, the propagation speed or wave velocity $c$ of which is measured by chronometry on a sufficient long base, or on the contrary a standing wave, the frequency $f$ of which is measured directly, the wavelength $\lambda$ being also measured or established by design.

In practice, the methods of the first category are preferably employed for absolute measurements and the methods of the second category are preferably employed for relative measurements. In point of fact, it is usually difficult to produce an "absolute" rate meter in the case of standing waves since the resonant frequencies are altered by a number of different factors and especially by the viscosity and conductivity of the gas as well as by possible distortion, solid conduction in the walls, coupling with the source of power and by other extraneous phenomena of the same kind.

Furthermore, it is of course always possible to calibrate an instrument which measures $c$ in a gas having a function $\gamma$ (T) which is already known. Such a method results in a relative measurement since it is not either $c$ or $\gamma$ which is measured but $c/c_0$ or $\gamma/\gamma_0$, the zero index being applicable to a sample of gas which is taken as a reference. The difficulties which arise from this method can readily be imagined, however, in the event that the gas being studied is not in the ideal state. It is therefore preferable to make provision for an apparatus which is capable of carrying out an absolute measurement which does not call for any calibration so that, starting from a single measurement in the case of the gas which is being studied, the value $c$ is determined by a calculation in which consideration is given solely to the known properties of the gas, to the characteristic values of its state (pressure and temperature) and certain data relating to the design of the apparatus.

The standing-wave rate meters which have been employed up to the present time consist of resonant cavities through which the gas flows and which are excited by means of a reed pipe or any like device after the fashion of a musical instrument. Their frequency changes with the gas at constant temperature. It is unfortunately impossible to know this frequency in advance even to within 10 or 20%. These apparatuses are not designed for absolute measurements and can give only the relative properties of one gas compared with another gas which is taken as a measurement standard.

The invention has for its object an apparatus for absolute measurement which makes use of standing waves and which permits the possibility of measuring the velocity of sound in any gas.

To this end, the apparatus in accordance with the invention is characterized in that it comprises on the one hand an enclosed resonance cavity having the geometrical shape of a right circular cylinder of which one base is formed by a thin fluid-tight diaphragm and on the other hand an excitation cavity which is external to said resonance cavity and a portion of the wall of which is formed by said diaphragm, excitation means and detection means housed within said excitation cavity, means for filling said cavities with gas and means for discharging said gas from said cavities.

In a particular form of embodiment, the apparatus comprises an elongated tubular element of cylindrical shape which is closed at both ends and the internal space of which is separated in fluid-tight manner by means of a thin transverse diaphragm which limits on each side the resonance cavity and excitation cavity.

The apparatus as thus designed is advantageously put to use by producing variation in the excitation frequency until there is obtained a minimum energy level as located by the detection means which represent the space coincidence of a vibration node and of the diaphragm by employing only very little energy at the time of the measurement and thus suppressing parasitic phenomena.

Further characteristic features and advantages will be brought out by the description which follows below and which relates to one example of embodiment which is given by way of indication and not in any limiting sense.

In the accompanying drawings:

FIG. 1 is a longitudinal sectional view, with portions seen from the exterior, of an apparatus which is constructed in accordance with the invention;

FIG. 2 is a diagrammatic view of a device which is employed for the purpose of filling the cavities of the apparatus in the event that the gas to be studied is either corrosive or dangerous.

In the form of embodiment which is illustrated in FIG. 1, the apparatus consists of a tubular element of elongated cylindrical shape and generally designated by the reference 1, the two ends of said element being closed by two plates 2 and 3.

The tubular element 1 is made up of two cylindrical portions 4 and 5 of unequal length which are placed end to end and which are coupled together by means of an annular retaining bush 6. As can be seen from the drawing, the cylindrical portion of cylinder 4 is of shorter length and of slightly larger internal diameter than the cylindrical portion or cylinder 5. This arrangement permits of easier assembly of the different components but is not mandatory.

The cylinders 4 and 5 of the element and of the bush 6 are preferably metallic but can also be fabricated of a rigid pressure-resistant material which can if necessary be burnished and which is not liable to be attacked by the gases which are to be introduced into the apparatus. For purposes of study of uranium hexafluoride $UF_6$, for example, copper and certain aluminum alloys will be found particularly suitable.

The length of the longer cylinder 5 is chosen as a function of the frequencies and wave velocities which are contemplated, thereby permitting the cavity which is formed by said cylinder to enter into resonance, as will be explained hereinafter.

The internal wall of the long cylinder 5 has a burnished surface without any rough excresence. One end of the said cylinder 5 is closed in fluid-tight manner by the end plate 3 which is provided with a circular central portion $3a$ of greater thickness, the wall of cylinder 5 being tightly fitted around said central portion whilst fluid-tightness is ensured by means of an annular sealing joint 7 which is fitted at the end of the cylinder between this latter and the plate.

The other end of the cylinder 5 is closed by a thin gas-tight diaphragm 8 having the shape of a disc which is applied at its periphery against the wall of said cylinder 5. Said diaphragm is advantageously formed of thin metallic sheet or foil which must be sufficiently thin to be capable of vibrating under the sound pulses which it receives and which must also not permit the diffusion of gas therethrough.

As can be seen from FIG. 1, the diaphragm is retained in position within a bore 10 of the bush 6 with interposition of an O-ring seal 9 which ensures fluid-tightness. The central hole of the bush 6 has the same diameter as the cylinder 5, the O-ring seal 9 and the extremity of the cylinder 5 being fitted within the bore 10. A bore 11 is formed within the bush at the opposite extremity thereof, there being fitted within said bore the annular flange 12 of a vibratory apparatus E for emitting sound waves, such as a loudspeaker of conventional type. A bore 13 of larger diameter forms an upward extension of the bore 11 of bush 6 and accommodates the wall of the short cylinder 4 of the tubular element with interposition of an O-ring seal 14 between the bush 6 and the cylinder 4. The arrangement of the various parts mentioned above is such that the bore 11 has a diameter which is equal to the internal diameter of the cylindrical portion 4. At a certain distance above the loudspeaker E, there is placed a wave-detecting apparatus D or "pick-up" such as a second loudspeaker or microphone comprising an annular flange 15.

The vibrator E and the detector D are secured in position by means of a certain number of threaded rods 16, one extremity of which passes through the annular flange 12 of the vibrator E and is screwed into a tapped blind-end bore 17 of the bush 6 whilst the other extremity thereof passes through the annular flange 15 of the detector D. Nuts 18, 19 and 20 block respectively in position the detector D and the vibrator E.

The distance between the detector D and the vibrator E is not critical; it is merely necessary to ensure that there are no common aliquot parts between the two cavities which will be referred-to hereinafter.

The cylinder 4 is closed at the top by the end plate 2 which is provided with a central cup 21 directed towards the cylinder 4, the annular rim of said cup being adapted to fit tightly within the cylinder with interposition of an O-ring seal 22 between the wall of the cylinder 4 and the plate 2. The cup 21 is pierced with holes 23, 23a and 24 which are hermetically plugged with insulating material through which are respectively passed electrical supply-leads $L_1$, $L_2$ and $L_3$ which are respectively connected to the detector D and the vibrator E. A hole of larger diameter permits the insertion of a thermometer $Th$ inside the cylinder 4, the said thermometer being held in position by means of a packing gland 25.

As can be seen from FIG. 1, the diaphragm 8 divides the internal space of the element 1 into two cavities, one cavity $C_E$ which is formed within the cylinder 4 and bush 6 and in which are located the sound wave vibrator E and the sound wave detector D, and another cavity $C_R$ or resonant cavity which is formed within the cylinder 5. These cavities are separated from each other in fluid-tight manner by the diaphragm 8, no obstacle being located within the cavity $C_R$ such as a weld bead, thermocouple or the like.

The complete unit is assembled by means of rods 26, the threaded extremities of which pass through the edges of the plates 2 and 3, the different component parts being locked in position by means of nuts 27, 28 and 29.

The cylinder 5 is pierced with an orifice 30 from which extends a rigid tube 31 which is welded to the cylinder wall. A flexible pressure-resistant pipe 32 is fitted over the tube 31 and connects the cavity $C_R$ to a vacuum-producing apparatus which has not been shown in the drawings. A valve 33 and a pressure gauge 34 are mounted on the pipe 32.

The cylinder 5 is also pierced with another orifice 35 into which opens a rigid tube 36 which traverses the wall of the cylinder and over which is fitted the extremity of a flexible pressure-resistant pipe 37, the other extremity of which is fitted over one branch of the rigid T-piece union 38. The T-piece union 38 is also connected to a pipe 39 which is derived from a gas source 40 such as a gas cylinder, for example, a valve 41 being interposed between the pipe 39 and the T-piece union 38. A flexible pipe 42 is fitted over the free branch of the T whilst the other extremity thereof is in turn fitted over a rigid tube 43 which traverses the wall of the cylinder 4 into which it opens through an orifice 44.

The complete apparatus is enclosed within a thermostatically controlled vessel 45 which is pierced with holes such as the holes 46, 47, 48, 49, 50 and 51 providing a passageway respectively for the connections $L_1$ and $L_2$, for the thermometer $Th$ and for the flexible pipes 32, 37 and 42. The said vessel makes it possible to maintain the complete apparatus at a practically constant temperature.

The lead wire $L_2$ which is connected to the vibrator E leads to a conventional variable frequency generator (not shown) which accurately provides a known frequency within a range comprising at least one harmonic of the frequency of resonance of the cavity $C_R$. As regards the lead wire $L_1$ which is connected to the detector D, said wire leads to a zero setting device of suitable type.

The installation which is illustrated in FIG. 1 is especially suitable in the case of measurements taken in a nontoxic and noncorrosive gas. The operation of the said installation is as follows:

When the valve 41 is closed, a vacuum is created within the cavities $C_E$ and $C_R$ by pumping through the valve 33. On completion of this operation, the gas to be studied which is derived from the source 40 is introduced through the valve 41. This operation is repeated if necessary a number of times in order to effect the complete elimination of gases previously present in the apparatus.

The vibrator E is then excited by means of the generator which has been referred to above and the frequency is caused to vary about the predetermined value while endeavoring to find the maximum wave suppression which is checked by observing the zero setting device which is connected by means of the lead wire $L_1$. At this moment, the diaphragm 8 is at a velocity node or point of zero velocity.

As soon as this frequency adjustment has been carried out, the antiresonance frequency of the generator is noted and the thermometer $Th$ is read. It will be understood that these measurements can be taken in respect of different gas pressures.

In the particular case in which the gas to be studied is corrosive or dangerous, there is employed the device which is illustrated diagrammatically in FIG. 2. Accordingly, the pipes 37 and 42 are connected to two pipe sections 56 and 55 respectively which are derived from a pressure balancing device 57 of any suitable type. Two connecting pipes 58 and 59 which are derived respectively from a source of inert gas consisting of a cylinder 60 and from a source of gas to be studied consisting of a cylinder 61 arrive at said balancing device 57. The gas to be studied is conveyed from the cylinder 61 through the connecting pipe 59, through the pressure-balancing device 57, through the connecting pipe 56 and the pipe 37 into the cavity $C_R$, whilst the inert gas is conveyed from the cylinder 60 through the connecting pipe 58, through the pressure-balancing device 57, through the connecting pipe 55 and the pipe 42 into the cavity $C_E$, the pressure-balancing device serving to maintain the equality of pressures on each side of the diaphragm 8.

The operation of the apparatus itself is in this second example identical to that which was described in reference to the form of embodiment of FIG. 1.

In a general manner and irrespective of the form of embodiment which is adopted, a measurement is taken of the value $f$ of the antiresonance frequency in respect of the gas to be studied and the velocity $c$ of said gas is directly deduced therefrom in the following manner:

The gas is directly excited by the vibrator E within the cavity $C_E$ but cannot enter into resonance in said cavity at the frequencies which are employed since the length of this latter is too short. On the other hand the length of the other cavity having been chosen in accordance with the frequencies and velocities which are contemplated, this empty cavity $C_R$ can reach the condition of resonance provided that the diaphragm is located at a velocity antinode. In fact, at this moment, inasmuch as the movement of the diaphragm is of maximum amplitude, the sound will be entirely transmitted from one cavity into the other and the wavelength will have the expression according to the known law of acoustics:

(1) $$\lambda = 4L/(2k+1)$$

with $k=0, 1, 2, 3 \ldots$ in which $k$ is the range of the preponderant harmonic in the sound which is emitted and $L$ is the length of the cavity $C_R$. The fundamental $k=0$ corresponds to a quarter-wave vibration.

On the other hand, when the diaphragm occupies a velocity node, it is practically motionless and transmits only a minimum of energy into the cavity CR.

At this moment, we evidently have the relation (2) $$\lambda = (2/k)L$$

with $k=1, 2, 3 \ldots$ in which $k=1$ corresponds to a half-wave vibration.

By replacing $\lambda$ by $c/f$ in the relation (2), there is obtained in known manner the Bernoulli equation:

(3) $$c = 2Lf/k$$

Since the order of magnitude of $c$ is known in advance, it is easy to determine the harmonic at which a particular measurement was taken. For convenience a harmonic of small magnitude is usually chosen (2 to 5). Furthermore, the frequency measurement may be conducted successively at two different harmonics in order to obtain a cross check of accuracy.

A knowledge of $c$ accordingly permits the possibility of detecting any alteration which occurs in the mean chemical composition of the gas considered. In fact, in the case of a gas in the ideal state, we have the relation:

(4) $$c = \gamma(R/M)T$$

in which T is the absolute temperature M is the mean molecular mass, $\gamma$ is the ratio of the specific heat at the constant-pressure $C_p$ to the specific heat at the constant volume $C_v$, and R is the universal constant of the gases.

The differences compared with the ideal state change the above relation to a greater or lesser extent, especially in the vicinity of the critical point. Be that as it may, and subject to the improbable event of compensation, the introduction of an impurity, by modifying M and $\gamma$, accordingly modifies $c$.

In this application, which requires in particular a substantial degree of sensitivity, the apparatus in accordance with the invention operates as a "sonic analyzer."

It is also known that, in a compressible fluid, the dynamic pressure $q$ is connected to the Mach number M and to the static pressure $p$ by the equation:

(5) $$q = \tfrac{1}{2}\gamma M^2 p$$

The values $p$ and $q$ are measured by means of direct manometric readers, with the result that the determination of M amounts to the determination of $\gamma$. In point of fact, in Equation (4), R, M and T can be replaced by exact numerical values to within $10^{-4}$. A measurement of $c$ to within $10^{-3}$ will accordingly give $\gamma$ to within an accuracy of $5/100$ which is equivalent to that which is usually obtained in the case of $p$ and $q$.

In this second application, which calls for an accuracy approximating to $1/1000$, the apparatus of the invention operates as a "Machmeter."

As will be understood, the invention is not limited to the form of embodiment which has been described and illustrated and which has been given solely by way of example.

What we claim is:

1. Apparatus for the absolute measurement of the velocity of sound within a gas comprising,
   means forming a fully enclosed resonance cavity having the shape of a right circular cylinder and having one base formed by a thin fluid-tight diaphragm;
   means forming an excitation cavity which is external to said resonance cavity and includes a portion of said diaphragm as a wall thereof;
   excitation means housed within said excitation cavity for generating vibrations;
   means housed within said excitation cavity for detecting vibrations;
   means for filling said cavities with gas; and
   means for discharging said gas from said cavities.

2. Apparatus as described in claim 1 wherein said means forming said resonance cavity and said excitation cavity include an elongated tubular element of cylindrical shape which is closed at both ends and divided internally by said thin transverse fluid tight diaphragm into said resonance cavity and said excitation cavity.

3. Apparatus as described in claim 1 wherein said resonance cavity and said excitation cavity are of different length and have uncommon frequencies of resonance.

4. Apparatus as described in claim 1 wherein the internal surface of said means forming said enclosed resonance cavity is burnished.

5. Apparatus as described in claim 1 wherein said excitation means is located relatively close to said diaphragm and said detection means is located on a side of said excitation chamber means most remote from said diaphragm.

6. Apparatus as described in claim 1 wherein said excitation means are adapted to be connected on a frequency generator located external to said apparatus.

7. Apparatus as described in claim 1 wherein said detection means are adapted to be connected to a calibrating device.

References Cited

UNITED STATES PATENTS

| | | | |
|---|---|---|---|
| 2,582,232 | 1/1952 | Cesare et al. | 73—24 X |
| 2,653,471 | 9/1953 | Clewell | 73—24 |
| 2,775,885 | 1/1957 | Rassweiler et al. | 73—24 |
| 2,785,567 | 3/1957 | Poole et al. | 73—24 |

JAMES J. GILL, *Acting Primary Examiner.*

RICHARD C. QUEISSER, *Examiner.*

C. IRVIN McCLELLAND, J. FISHER,
*Assistant Examiners.*